Aug. 29, 1939.  G. O. CONNER  2,171,302
GASKETED FITTING
Filed Oct. 8, 1938
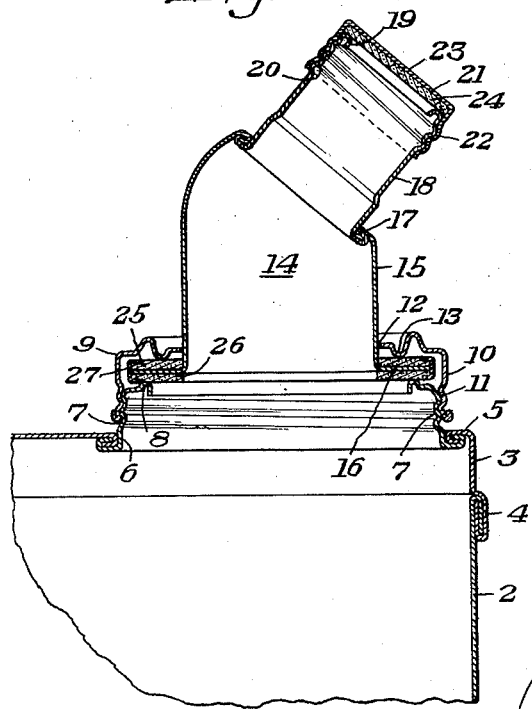
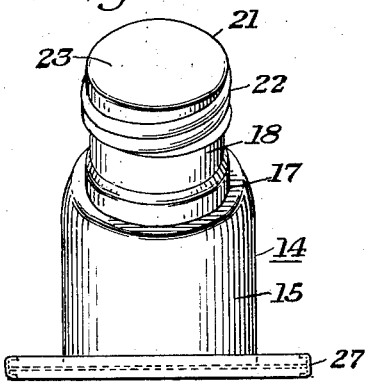
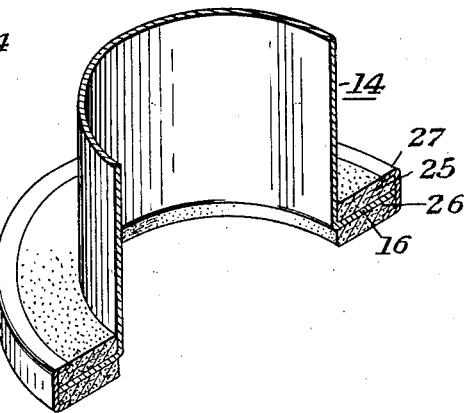
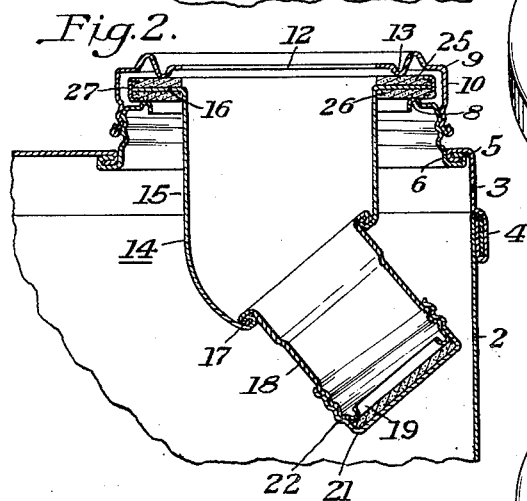
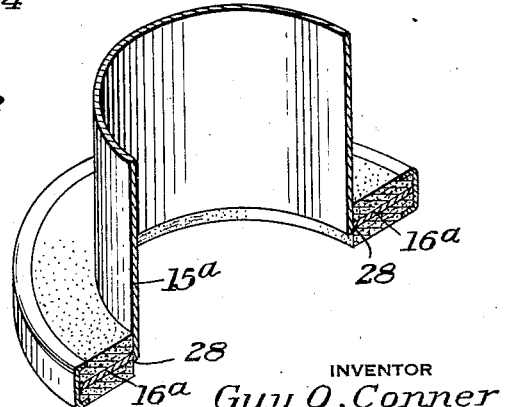
INVENTOR
Guy O. Conner
by his attorneys
Stebbins, Blenko & Parmelee Patented Aug. 29, 1939

2,171,302

UNITED STATES PATENT OFFICE 2,171,302

GASKETED FITTING

Guy O. Conner, Wheeling, W. Va., assignor to Wheeling Steel Corporation, Wheeling, W. Va. a corporation of Delaware Application October 8, 1938, Serial No. 234,002

10 Claims. (Cl. 221—24)

This invention relates broadly to gasketed fittings, that is, fittings adapted to be sealed to other fittings, conduits or containers and having gasket means permanently connected therewith. The invention relates more particularly to a novel provision for permanently fastening gasket means to flanged fittings. In certain of its still more specific aspects the invention has to do with the provision of a gasketed sheet metal fitting, such, for example, as a sheet metal spout, adapted for use in pouring out the contents of a container and adapted when applied to the container to be sealed thereto by the gasket means permanently connected with the spout.

Purely for the sake of illustration the invention will be described as embodied in a sheet metal spout for containers. Such spouts are adapted for application to containers to facilitate the pouring out of their contents. They are customarily used with sheet metal storage and shipping containers used for the storage and shipping of many liquid products. It is well known in the art to permanently connect gasket means with spouts of the type mentioned. Such connections have been effected by deforming the spout itself to provide means for holding the gasket in place, employing glue, cement or other adhesive to adhesively attach the gasket means to the spout, providing means engaging the inner edge of the annular gasket to hold it in place on the spout, and other similar provisions.

It is also well known in the art to employ reversible spouts with shipping containers, that is, spouts adapted when not in operative position to be reversed and inserted lip end foremost into the container. Such spouts are customarily provided with a flange having a gasket lying against each of the two opposed faces thereof so that when the spout is in operative position one of the gaskets will lie in sealing relationship to the nozzle or outlet of the container and when the spout is in inoperative position the other gasket will be similarly sealed to the container. The means heretofore employed for attaching to the spout the gaskets lying against the opposed faces of the spout flange are of the types above mentioned. In some cases the gasket lying on the lip side of the flange has simply been frictionally engaged with the body of the spout to hold it in place.

I provide a gasketed fitting comprising a hollow fluid conducting member having an outwardly projecting flange and with either one gasket lying against one face of the flange or two gaskets lying against the respective opposed faces of the flange and means, preferably separate from the flange, for holding the gasket or gaskets in place on the flange and engaging the gasket or gaskets at the outer portion or portions thereof. The means for holding the gasket or gaskets in place on the flange preferably comprises an annulus of suitable material, such, for example, as sheet metal, disposed at the periphery of the spout flange and gasket means and embracing portions thereof.

Other details, objects and advantages of the invention will become apparent as the following description of certain present preferred embodiments thereof proceeds.

In the accompanying drawing I have shown certain present preferred embodiments of the invention, in which Figure 1 is a central vertical cross-sectional view through a sheet metal container having a spout applied thereto in operative position;

Figure 2 is a view similar to Figure 1 but showing the spout in inoperative position;

Figure 3 is an elevational view of the spout shown in cross section in Figures 1 and 2, the spout as shown in Figure 3 being viewed as from the right in Figure 1;

Figure 4 is a detail central vertical cross-sectional view to enlarged scale of a portion of the spout shown in Figures 1, 2 and 3; and Figure 5 is a view similar to Figure 4 showing a modified construction.

Referring now more particularly to the drawing, there is shown a sheet metal shipping container 2 having a top 3 seamed thereto at 4. Seamed to the top 3, preferably eccentrically thereof, as at 5, is an outlet or nozzle 6, also of sheet metal and preferably having external screw threads 7 formed therein and having an upwardly presented sealing lip 8. The spout presently to be described is adapted to be sealed to the container at the lip 8 of the nozzle 6, as will presently be described, and to be maintained in place on the container and pressed against the lip 8 by a sheet metal cap 9 whose skirt 10 is internally screw threaded as shown at 11 to enable the cap to be screwed down onto the nozzle 6, the internal screw threads 11 of the cap having threaded engagement with the external screw threads 7 of the nozzle. The cap 9 has a circular opening 12 in its top to enable the cap to be slipped down over the spout when the spout is in operative position, and the cap also has a downwardly presented lip 13 offset inwardly from the lip 8 of the nozzle for pressing against the spout flange and sealing the spout to the container.

In Figures 1 to 4, inclusive, I have shown a sheet metal spout designated generally by reference numeral 14. The spout comprises a body portion 15 integrally drawn out of sheet metal and having an integral out-turned flange 16. Seamed to the body portion 14 of the spout at 17 is a pouring or lip portion 18, which is also integrally drawn out of sheet metal. Thus each of the spout portions 15 and 18 is itself seamless. The portion 18 of the spout has at its outer extremity a sealing lip 19 and is provided with external screw threads 20. A sheet metal cap 21 having a screw threaded skirt 22 and an imperforate top 23 and provided therewithin with a gasket 24 is applied to the spout portion 18 to seal the same. The spout portion 18 is preferably inclined to the spout portion 15 as shown.

The spout 14 is shown as having a gasket 25 lying against the lip side of the flange 16 and a gasket 26 lying against the opposite face of the flange. The gaskets are held in place on the flange by a retainer 27. The retainer 27 in the form shown is a continuous unseamed annular sheet metal member which has its ends turned inwardly to engage the respective gaskets as shown in Figure 4. The retainer is also shown as engaging the periphery of the flange 16, and it may or may not be soldered or spot welded to the flange. It is not essential that the retainer engage the flange at all, and if the gaskets extend outwardly slightly beyond the periphery of the flange the retainer, although embracing the peripheral edge of the flange, will not come into direct engagement with it.

The structure of Figure 5 is the same as that of Figure 4 except that in Figure 5 the spout flange 16a is formed seeparately from the spout body 15a and is connected thereto at 28 as by welding or soldering. Aside from this detail of construction of the spout the structure is identical with that of Figure 4.

My gasket retainer 27 may be used equally effectively for holding a single gasket in place on the spout flange. If a spout or other fitting is equipped with only a single gasket the retainer will embrace that gasket and the outer portion of the spout flange in a manner similar to its manner of application to the structures shown in the drawing.

The use of gasket retaining means as herein described and claimed has numerous advantages over structures heretofore employed for the same purpose. One of the primary advantages is reduction of cost and simplicity and ease of assembly. The spout itself does not need to be deformed in any way to enable holding of the gasket or gaskets in place thereon. No adhesive substance is employed, thus avoiding possible contamination of the contents of the container or loosening of the adhesive due to the action of the contents of the container. The positioning of the retainer at the outer periphery of the spout flange and gasket means is of particular advantage when the retainer is of a material which will contaminate or be attacked by the contents of the container. Contact of the contents of the container with the bottom gasket is confined to the inner portion of the gasket by the lip 8, so the contents of the container do not reach the retainer 27 at all.

I prefer to form the retainer out of a continuous unseamed annular or generally tubular piece of metal and to slip such piece of metal generally axially of the spout portion 15 over the flange and gasket means and then deform the same by bending or die-forming its edges inwardly so that the retainer assumes a generally U-shaped cross section. Before the retainer is slipped over the spout flange and gasket means one edge may already having been turned inwardly, so that it is only necessary after application of the retainer to the spout to turn the other edge inwardly to embrace the gasket means.

While I have shown and described certain present preferred embodiments of the invention, it is to be distinctly understood that the same is not limited thereto but may be otherwise variously embodied within the scope of the following claims.

I claim:

1. A gasketed fitting comprising a hollow fluid conducting member having an outwardly projecting flange, a gasket lying against a face of the flange, and a retainer separate from the flange for holding the gasket in place on the flange, the retainer engaging the gasket at the outer portion thereof, the internal diameter of the portion of the retainer engaging the gasket being substantially greater than the external diameter of the hollow fluid conducting member.

2. A gasketed fitting comprising a hollow fluid conducting member having an outwardly projecting flange, a gasket lying against a face of the flange, and a retainer separate from the flange for holding the gasket in place on the flange, the retainer being connected with the flange and engaging the gasket at at least a portion of its outer periphery.

3. A gasketed fitting comprising a hollow fluid conducting member having an outwardly projecting flange, a gasket lying against a face of the flange, and a retainer separate from the flange for holding the gasket in place on the flange, the retainer being of generally U-shaped cross section with the U opening inwardly toward the axis of the hollow fluid conducting member and embracing portions of the gasket and flange, a portion of the face of the gasket being exposed.

4. A gasketed fitting comprising a hollow fluid conducting member having an outwardly projecting flange, a gasket lying against each of the two opposed faces of the flange, and a one-piece retaining member at the periphery of the flange and gaskets for holding both gaskets in place on the flange, a portion of the face of at least one of the gaskets being exposed.

5. A gasketed fitting comprising a hollow fluid conducting member having an outwardly projecting flange, a gasket lying against each of the two opposed faces of the flange, and retaining means of generally U-shaped cross section disposed at the periphery of the flange and gaskets and embracing portions thereof for holding both gaskets in place on the flange, the internal diameters of the respective portions of the retaining means lying against the gaskets being substantially greater than the external diameter of the hollow fluid conducting member.

6. A gasketed fitting comprising a hollow fluid conducting member having an integral outturned flange, a gasket lying against a face of the flange, and retaining means separate from the flange for holding the gasket in place on the flange and engaging the gasket at the outer portion thereof, the internal diameter of the portion of the retaining means engaging the gasket being substantially greater than the external diameter of the hollow fluid conducting member.

7. A gasketed fitting comprising a hollow sheet metal spout member having an outwardly projecting sheet metal flange, a gasket lying against a face of the flange, and retaining means separate from the flange for holding the gasket in place on the flange and engaging the gasket at the outer portion thereof, the internal diameter of the portion of the retaining means engaging the gasket being substantially greater than the external diameter of the hollow sheet metal spout member.

8. A reversible spout for containers and the like having an outwardly projecting flange, a gasket lying against each of the two opposed faces of the flange, and common means at the periphery of the flange and gaskets for holding both gaskets in place on the flange, the internal diameter of said last mentioned means being substantially greater than the external diameter of the spout.

9. A gasketed fitting comprising a hollow fluid conducting member having an outwardly projecting flange, a gasket lying against a face of the flange, and a continuous unseamed annular retainer separate from the flange engaging the gasket at the outer portion thereof for holding the gasket in place on the flange, the internal diameter of the portion of the retainer engaging the gasket being substantially greater than the external diameter of the hollow fluid conducting member.

10. A gasketed fitting comprising a hollow fluid conducting member having an outwardly projecting flange, a gasket lying against a face of the flange, and a piece of sheet metal disposed at the periphery of the gasket and bent to embrace portions of the gasket and flange to hold the gasket in place on the flange, a portion of the face of the gasket being exposed.

GUY O. CONNER.